United States Patent Office 2,800,469
Patented July 23, 1957

2,800,469

MIXED ACID SALTS OF DIHYDROSTREPTOMYCIN AND PROCESS OF PREPARING SAME

Virgil V. Bogert, Malverne, and Isaiah A. Solomons III, Garden City, N. Y., assignors to Chas. Pfizer & Co., Inc., New York, N. Y., a corporation of New Jersey No Drawing. Application May 4, 1951,
Serial No. 224,678

11 Claims. (Cl. 260—210)

Our present invention relates to novel, mixed acid salts of dihydrostreptomycin, which are distinguished by their relatively slight solubility in water. The invention further concerns the preparation of such salts and their use in the purification of dihydrostreptomycin.

Dihydrostreptomycin is a highly valuable form of antibiotic derived from streptomycin by reduction. Its properties, both chemical and biological, have been fully described in the recent literature. The well-known, simple salts of dihydrostreptomycin, such as the hydrochloride, sulfate and the like, have extremely high solubility in water. This tends to make difficult the recovery of the compounds, particularly in pure, crystalline form, by a simple procedure.

An object of our invention is a group of novel salts of dihydrostreptomycin, which have aqueous solubility definitely lower than the hitherto known simple salts. It is, of course, recognized that the salts of dihydrostreptomycin with sulfonic acid dyes and such precipitants as reinecke acid or picric acid also have lower aqueous solubility than the simple salts, such as the sulfate. However, these complex salts are of no use in therapy, whatever may be their use in the recovery of dihydrostreptomycin and they are not of use in separating streptomycin from mannosidostreptomycin. A further object of this invention is a method of isolating dihydrostreptomycin as a pure, crystalline compound by the formation of one of the new group of salts. An additional object is a method of separating dihydrostreptomycin from mannosido dihydrostreptomycin associated therewith.

It is known that the dihydrostreptomycin molecule is a triacidic base which normally forms salts with three equivalents of an acid. The simple, therapeutically useful salts, such as the hydrochloride, hydrobromide, sulfate, acetate, citrate and the like, all possess extremely high solubility in water. Attempts to crystallize these materials by concentrating an aqueous solution are almost invariably fruitless. We have now found that, most unexpectedly, when salts of dihydrostreptomycin are formed with at least two different inorganic acids, the aqueous solubility of the mixed acid salt is definitely lower than that of the corresponding single acid salts. Thus, for instance, a salt of dihydrostreptomycin has been prepared by combining two equivalents (one molecule) of sulfuric acid and one molecule of hydriodic acid per molecule of dihydrostreptomycin. This mixed acid salt has a solubility in water of a much lower order that the solubility of either the simple hydriodide or the simple sulfate. Comparable mixed acid salts of dihydrostreptomycin, containing hydrochloric acid and sulfuric acid, hydrobromic and sulfuric acids, hydriodic and sulfurous acids, nitrous and thiosulfuric acids, have also been prepared. All of these compounds may be crystallized directly from aqueous solution in contrast to the corresponding single acid salts.

Generally speaking, our new mixed acid salts of dihydrostreptomycin may contain two or three different anions. Usually they contain two different anions, and in most cases one of these is monovalent, while the other is bivalent. However, all anions may be monovalent or bivalent, and one of the anions can be trivalent, as in the case of the phosphate. When the anions combined with the dihydrostreptomycin include polyvalent anions having total valencies in excess of three, then it is likely that one of the polyvalent anions may be linked to more than a single dihydrostreptomycin molecule, or it may be only partly satisfied thereby. The precise structures of all of the mixed acid salts that may be prepared according to our invention, are not known to us. However, we do know that they can be prepared in crystalline form and that the presence of several different inorganic anions may be demonstrated by analysis. Typical inorganic acids suitable for forming the mixed acid salts of our invention are sulfuric, sulfurous, hydrochloric, thiosulfuric, hydrobromic, hydriodic, nitric, nitrous, thiocyanic and phosphoric acids.

The aqueous solubility of the mixed acid salts described above varies considerably but each one is less soluble in water than either of the corresponding single acid salts, and each one may be crystallized directly from aqueous solution. The aqueous solubility of these mixed acid salts is of a different, much lower order than is the solubility of the single acid salts. Of the mixed acid salts specifically mentioned above, the iodide-sulfite has the lowest aqueous solubility, with the iodide-sulfate somewhat higher, and the bromide-sulfate still higher. When salts of a number of different inorganic acids are present in aqueous solution with dihydrostreptomycin, the particular mixed acid salt with the lowest solubility will separate, assuming that the total concentration is high enough and sufficient amounts of each anion are present. Thus, if substantial amounts of both sodium sulfate and sodium iodide are added to an aqueous solution of dihydrostreptomycin hydrochloride having a potency of about 80,000 units/ml. or higher, the idodie-sulfate will separate. The solubility of the salts also vary somewhat with pH of the solution in which they are formed. We generally prefer to maintain this pH at between about pH 4 and about pH 8. The effect of pH upon the solubility may be particularly apparent when a mixed salt of dihydrostreptomycin with at least one polyvalent ion is involved. The pH for minimum solubility of a given mixed salt may be determined with the minimum of testing.

In preparing the new mixed acid salts of this invention, a concentrated aqueous solution of one of the single acid salts of dihydrostreptomycin, e. g. the sulfate, may be treated with any soluble salt, preferably an alkali metal, ammonium or organic ammonium salt, of a different inorganic acid, e. g. sodium iodide. The solution is stirred and allowed to stand, and in a short time crystals of a mixed acid salt begin to separate. Generally the crystallization is completed within a few hours. If desired, the solution may be cooled and/or seeded to hasten formation of the crystalline mixed acid salt. When dihydrostreptomycin sulfate is used as the starting material, there is customarily employed an aqueous solution containing at least about 80,000 units of the antibiotic per milliliter. Higher concentrations are desirable, if some of the more soluble mixed acid salts are to be prepared. Generally at least one equivalent, preferably about two, of the added salt is employed per molecule of the antibiotic. The presence of some excess of the added salt will serve to depress the solubility of the resultant mixed acid salt. For instance, excess sodium iodide or excess sodium sulfate will depress the solubility of the iodide-sulfate, but a mixture of excess sodium iodide and sodium sulfate is even more effective. The sulfite-iodide of dihydrostreptomycin has a solubility of about 48,000 mcg./ml. of water, whereas in the presence of an excess of the salts used to form the antibiotic compound the solubility is depressed to about 25,000 mcg./ml. or lower.

A particularly valuable feature of our invention is that relatively crude solutions of dihydrostreptomycin may be used for the preparation of the new crystalline, mixed acid salts. Thus, for instance, streptomycin in crude form recovered from fermentation broth by some such method as adsorption on an ion-exchange resin and elution with acid, may be hydrogenated to yield an aqueous solution of crude dihydrostreptomycin. The aqueous solution must be concentrated either before or after hydrogenation, and any impurities that may separate during such concentration must be removed by filtration. Removal of such impurities may be promoted by the addition of an organic solvent such an methanol. The concentration of the resultant crude aqueous dihydrostreptomycin solution must be at least about 100,000 units per milliliter and, preferably, over 200,000 units per milliliter, in order that a reasonably high proportion of the antibiotic may be separated as one of the new mixed acid salts. Some combinations of acids require an even higher concentration of antibiotic to obtain an appreciable yield of the mixed acid salt. The crystalline, mixed acids salts separate in pure form and, when acids of low toxicity have been used in the formation of these salts, the product may be used directly in therapy. If an acid unsuitable for therapeutic use is involved in the formation of the mixed acid salts, it may be replaced by a suitable metathetical reaction to yield a highly purified dihydrostreptomycin salt suitable for use in therapy.

It is particularly interesting that dihydromannosidostreptomycin mixed acid salts either do not crystallize or have much higher solubilities than the corresponding mixed acid salts of dihydrostreptomycin. Thus, the formation of our new salts affords a convenient method of separating the dihydrostreptomycin from the less desirable, lower potency mannosido compound. It is amazing that our invention is not equally applicable to streptomcyin. There is no corresponding difference in the properties of mixed acid salts and single acid salts of streptomycin.

It has been disclosed above that dihydrostreptomycin sulfate may be used as the starting material for a group of mixed acid salts. However, our invention is not confined to the use of the sulfate as starting material. For instance, a series of mixed acid salts of dihydrostreptomycin have been prepared using the iodide as starting material. A concentrated aqueous solution of the iodide may be prepared from the sulfate by metathesis, for example by adding barium iodide and filtering out the barium sulfate formed. When adding one or more molar equivalents of a water-soluble salt, preferably an alkali metal or ammonium salt, of the following anions to such a concentrated aqueous solution of dihydrostreptomycin trihydriodide, crystalline, mixed acid salts readily separated from the solution:

| | |
|---|---|
| Chlorate | Sulfite |
| Hydrosulfite | Chloride |
| Nitrate | Bromide |
| Nitrite | Thiosulfate |

An aqueous solution of about 500,000 units per milliliter of the iodide was used, but lower potency solutions may also be used. Alternatively, concentrated dihydrostreptomycin chloride or dihydrostreptomycin bromide solutions may be used as starting material for the preparation of comparable mixed acid salts.

Care, of course, must be taken that the inorganic salts used for formation of the mixed acid salts of dihydrostreptomycin are compatible. Thus, the use of silver sulfate with dihydrostreptomycin iodide to form the sulfate-iodide is obviously unsuitable. The inorganic salts formed as by-products of the desired partial metathesis must be water-soluble.

The dihydrostreptomycin base may be used as starting material and in this case the chosen inorganic anions are added as the acids, e. g. sulfuric acid and hydriodic acid in suitable amounts to form a mixed acid salt.

In most cases at least one monovalent inorganic anion is combined in the mixed acid salt. A divalent inorganic anion will generally combine with two of the three basic groups present in the dihydrostreptomycin molecule. It seems likely that in some cases a single polyvalent inorganic anion may be linked to more than one dihydrostreptomycin molecule. Whatever may be the structure of the new compounds of this invention, they have been found very useful. Several of the mixed acid salts have been tested for acute toxicity in mice and found to be quite comparable to the sulfate of the antibiotic. Obviously, anions known to be highly toxic cannot be used in the preparation of the new mixed acid salts, when they are to be used for therapy. However, such compounds may be used in the recovery and purification of the antibiotic, if the toxic anions are then carefully eliminated. It has been reported that iodides potentiate the effect of streptomycin on experimental tuberculosis. The iodide mixed acid salts of this invention constitute novel means for furnishing the iodide combined with the therapeutic agent.

The following examples are given by way of illustration and are not to be considered as the only embodiments of this invention.

Example I

A dihydrostreptomycin sulfate concentrate was obtained by recovery of the antibiotic from streptomycin fermentation broth with a carboxylic acid-type ion-exchange resin. After elution of the antibiotic from the resin with dilute hydrochloric acid, the resultant solution was concentrated, further purified, and converted to streptomycin sulfate. The sulfate was reduced to yield a material of about 90% purity. The portion of concentrate used weighed 1150 grams and had a potency of 317,000 units per milliliter. To this concentrated aqueous solution 182 grams of sodium iodide were added with constant stirring. Crystals soon began to separate from the clear solution which was maintained at about room temperature. The mixture was let stand about two to three hours at room temperature, and the heavy crystalline product was filtered. The crystals were washed with a small volume of ice water and dried at a temperature of 50–60° C. at atmospheric pressure. The product weighed 452 grams and had a potency of 730 units per milligram. In the filtrate from the crystals (545 milliliters) there were present 26,000 units per milliliter of the antibiotic; a total of 3.88% of the antibiotic used as starting material. The ice water wash had a volume of 375 milliliters and assayed 39,000 units per milliliter. This is 4.02% of the total antibiotic used as starting material.

A 100 gram portion of the crystalline product described above was recrystallized by dissolving it in 3 to 4 times its weight of water. The water was heated to 80 to 90° C. in order to dissolve the product and, on cooling, the crystals which separated were filtered. This material amounted to 9 to 10 grams. On concentrating the solution, 65.7 grams of very highly purified dihydrostreptomycin sulfate-iodide were obtained, which assayed 750 mcg./mg. when air dried. When dried under high vacuum it assayed 765 mcg./mg. This is equivalent to a very high potency crystalline dihydrostreptomycin sulfate.

A sample of the sulfate-iodide of dihydrostreptomycin was dried at 78° C. under high vacuum overnight and then analyzed.

*Anal.*—Calcd. for $C_{21}H_{41}N_7O_{12} \cdot HI \cdot H_2SO_4$: C, 31.14; H, 5.48; N, 12.11; $SO_4^=$, 11.87; $I^-$, 15.67. Found: C, 31.21; H, 5.61; N, 12.22; $SO_4^=$, 11.85; $I^-$, 15.47.

Example II

A portion of pure dihydrostreptomycin sulfate weighing 12.5 grams was dissolved in 12 milliliters of water. To this solution were added 3.5 grams of sodium bromide (2 molar equivalents) dissolved in 5 milliliters of water. On standing a short time, crystals separated. These were removed after an hour, and the product was washed with a small volume of ice water. The crystals were dried at 50 to 60° C. They weighed 8.6 grams and assayed, by the microbiological method, 720 units per milligram. The mother liquor from the preparation of the crystalline sulfate-bromide of dihydrostreptomycin had a volume of 14 milliliters and contained 83,000 units per milliliter of antibiotic. The wash had a volume of 17 milliliters and contained 85,500 units per milliliter.

A sample of the sulfate-bromide was heated at 70° C. under high vacuum overnight. The material was then analyzed.

Anal.—Calcd. for $C_{21}H_{41}N_7O_{12} \cdot HBr \cdot H_2SO_4$: C, 33.06; H, 5.82; N, 12.86; Br−, 10.48; $SO_4^=$, 12.60. Found: C, 33.14; H, 6.03; N, 12.78; Br−, 10.62; $SO_4^=$, 12.55.

Example III

Dihydrostreptomycin sulfate weighing 13.75 grams was dissolved in 13.2 milliliters of water. To this solution were added 2.7 grams of sodium chloride. The solution was stirred until the sodium chloride had dissolved, and the mixture was allowed to stand overnight. The crystalline product that had separated was filtered, washed with a small volume of ice water and dried. This product, dihydrostreptomycin sulfate-chloride, weighed 4.3 grams and assayed 770 mcg./mg. when air dried.

Example IV

A series of portions of crystalline dihydrostreptomycin sulfate, weighing 1.25 grams each, was placed in a group of small beakers. Each of the potrions was dissolved in 1.2 ml. of water and then 2 molar equivalents of each of several inorganic salts were added to the beakers. Upon addition of the following salts, a crystalline, mixed acid salt of dihydrostreptomycin soon separated from the aqueous solution:

Sodium nitrate
Sodium nitrite
Sodium sulfite
Sodium thiocyanate
Sodium thiosulfate In the case of the first two of these compounds, the crystalline dihydrostreptomycin mixed acid salts separated in very good yields. In the case of the last three compounds, the yield of product was considerably lower. When sodium bromate and sodium iodate were added to the dihydrostreptomycin sulfate solutions, little or no precipitate was formed at the given concentration.

A series of portions of dihydrostreptomycin trihydriodide, each weighing 1.65 grams, was placed in a group of beakers. Each portion of the antibiotic salt was dissolved in 1.2 ml. of water. To each beaker there were added 2 molar equivalents of a salt from the following list:

Sodium chloride
Sodium hydrosulfite
Sodium nitrate
Sodium nitrite
Potassium sulfite
Sodium thiosulfate
Sodium bromide
Ammonium sulfate In each case, within a short time after the added salt had been dissolved, there separated from the solution the corresponding mixed acid salt of dihydrostreptomycin.

Example V

Three portions of dihydrostreptomycin trihydrochloride, weighing 1.2 grams each, were each dissolved in 1.2 ml. of water. When 2 molar equivalents of sodium sulfite were added to one portion of the antibiotic solution, there soon separated the crystalline sulfite-chloride of dihydrostreptomycin. However, when sodium bromide and sodium nitrate were added to the other portions of the antibiotic hydrochloride solution, no appreciable amount of crystalline salt separated at this particular concentration.

Example VI

A streptomycin fermentation broth obtained by the growth of *Streptomyces griseus* under submerged aerated conditions in a nutrient medium was filtered to remove the mycelium. A water-soluble polyphosphate was added to the filtered broth to sequester polyvalent metals, and the broth was then passed through a tower containing a carboxylic acid-type of synthetic ion-exchange resin. After washing the resin with a small volume of water, the antibiotic was eluted with dilute hydrochloric acid. Calcium was removed from the eluate with oxalic acid, and the excess hydrochloric acid was neutralized. The aqueous solution was concentrated under vacuum to a concentration of over 200,000 mcg./ml. The inorganic salts which had separated were filtered, and the solution was subjected to catalytic reduction at a temperatuer of about 75–80° C., under 1000 p. s. i. pressure of hydrogen using a Raney nickel catalyst. When the reduction was substantially complete, the catalyst was removed by filtration from the cooled solution. The concentrate of dihydrostreptomycin hydrochloride which was obtained assayed, by the microbiological method, about 243,000 mcg./ml.

One hundred milliliters of this crude dihydrostreptomycin hydrochloride concentrate (0.042 M) were treated with 13 grams of anhydrous sodium sulfate (0.092 M). After this added salt had dissolved, a small amount of a non-crystalline precipitate was filtered out, and 14 grams (0.093 M) of sodium iodide were then added. The mixture was stirred until the solution was complete, and crystals of a dihydrostreptomycin mixed acid salt slowly began to crystallize. The mixture was allowed to stand several days at room temperature. The crystalline product was then filtered, washed with a small volume of ice water and dried at about 50 to 60° C. It weighed 25.70 grams and had a potency, by the microbiological method, of 655 mcg./mg. This product was shown by analysis to be the sulfate-iodide of dihydrostreptomycin.

Example VII

A number of portions, each containing 1.3 grams of dihydrostreptomycin trihydrobromide, were diluted to 2.0 milliliters with water. Using the same procedure as in Example IV, each of these portions was treated with 1½ molar equivalents of the following salts to form the corresponding mixed dihydrostreptomycin salt:

Sodium hydrosulfite
Sodium thiosulfate
Sodium sulfite
Sodium nitrate
Sodium nitrite
Sodium chloride The mixed bromide-hydrosulfite, bromide-thiosulfate and bromide-sulfite crystallized from the solutions, but at the concentrations used the mixed bromide-nitrate, bromide-nitrite and bromide-chloride did not crystallize.

Example VIII

A series of portions, each containing 1.3 grams of dihydrostreptomycin trinitrate, was weighed out. Each of these was diluted to 2.0 milliliters with water and to the portions of the solutions were added 1½ molar equivalents of each of the following salts:

Sodium bromate
Sodium chlorate
Sodium iodide
Sodium perchlorate
Sodium sulfite
Sodium thiocyanate
Sodium thiosulfate In each case the crystalline mixed salt of dihydrostreptomycin separated from the reaction mixture. When sodium bromide, sodium fluoride, sodium nitrite and sodium chloride were used, no mixed salt separated at the particular concentration used.

Example IX

Dihydrostreptomycin trihydriodide weighing 16.5 grams was dissolved in 8 milliliters of water. Ten milliliters of an aqueous solution of triethylamine sulfite was added. The latter was prepared by suspending 300 grams of triethylamine in 250 milliliters of water and stirring and cooling the mixture while sulfur dioxide was bubbled through it. When a pH of 6.6 was reached, the sulfur dioxide was stopped. The volume of the solution at this time was 575 milliliters. When 10 milliliters of the solution was added to the hydriodide of dihydrostreptomycin, the pH of the mixture dropped to 4.6. It was adjusted to 6.1 with a 10% solution of sodium hydroxide. After standing four hours at room temperature, the crystalline dihydrostreptomycin iodide-sulfite was filtered. It was washed with a small volume of ice water and dried at room temperature overnight. The product weighed 11.8 grams and had a potency of 700 mcg./mg. The mother liquor had a potency of 58,000 mcg./ml.

*Example X*

A streptomycin hydrochloride concentrate obtained as described in Example VI was dehydrated and then dissolved in methanol. The methanolic concentrate of streptomycin hydrochloride so obtained was filtered from the insoluble salts. The clear methanolic solution was then evaporated to remove all the methanol. Water was added to obtain a solution having a potency of about 400,000 mcg. of streptomycin per ml. Raney nickel catalyst was added, and the mixture was hydrogenated at about 80° C. under 1000 p. s. i. pressure of hydrogen. After the reaction was completed, the mixture was cooled, and the catalyst was washed with water to remove residual material. The solution was shown, by biological assay, to contain 294,000 mcg. of dihydrostreptomycin per ml. It was found to have been converted to the dihydrostreptomycin compound to the extent of about 95%.

One hundred milliliters of the dihydrostreptomycin hydrochloride (0.053 M) concentrate was treated with 16.6 grams (0.117 M) of sodium sulfate. The mixture was stirred until a clear solution was obtained and then 17.5 grams (0.117 M) of sodium iodide were added. The crystalline sulfate-iodide of dihydrostreptomycin soon began to separate. The mixture was stirred and cooled in an ice bath for one hour. The product which separated in small needles was filtered, washed with ice water and dried at about 50–60° C. The product, which was off-white in color, weighed 28.4 grams. The material which contained some inorganic salts assayed, by the microbiological method, 605 mcg./mg. A yield of 60% was obtained in this first crop based on the amount of dihydrostreptomycin in the aqueous concentrate. The mother liquor, with a volume of 53 ml., contained 128,000 mcg. of antibiotic per ml. (biological assay, calculated as dihydrostreptomycin). The wash water had a volume of 52 ml. and assayed 113,000 mcg./ml. Further crystalline dihydrostreptomycin sulfate-iodide was recovered by concentrating the mother liquor and wash under vacuum. The assay of the first crop was raised to about 745 mcg./mg. by recrystallization.

We have found that dihydromannosidostreptomycin sulfate-iodide does not separate under the same conditions as described above. Thus, the above procedure is useful for separating the less valuable mannosido compound which has a considerably lower biological potency than dihydrostreptomycin.

We have also found that the solubility of the iodide-sulfate of dihydrostreptomycin is decreased by the presence of excess inorganic iodide salt or of excess inorganic sulfate. However, a mixture of inorganic iodide and inorganic sulfate is more effective than either of the inorganic salts above in depressing the solubility of the iodide-sulfate of dihydrostreptomycin. Hence it is desirable always to have an excess of both participating anions present in the solution.

We claim:

1. A crystalline mixed acid salt of dihydrostreptomycin in which the antibiotic is combined with 2 different non-toxic inorganic acids.
2. A crystalline mixed acid salt of dihydrostreptomycin in which the antibiotic is combined with a dibasic inorganic acid and a non-toxic monobasic inorganic acid.
3. Dihydrostreptomycin sulfate-iodide.
4. Dihydrostreptomycin sulfite-bromide.
5. Dihydrostreptomycin sulfite-iodide.
6. A process for preparing a mixed acid salt of dihydrostreptomycin, which comprises adding to a concentrated aqueous solution of a single acid salt of dihydrostreptomycin at least about 1 molar equivalent of a water-soluble salt having a different inorganic anion, and crystallizing the mixed acid salt product directly from the aqueous solution.
7. A process as claimed in claim 6 wherein the potency of the initial solution is at least about 200,000 mcg./ml. and about 2 molar equivalents of the water-soluble salt are added.
8. A process as claimed in claim 6, wherein the water-soluble salt added is selected from the group consisting of alkali metal, ammonium, and organic ammonium salt.
9. A process as claimed in claim 6, wherein the initial dihydrostreptomycin salt contains a dibasic acid and the added water-soluble salt contains a monovalent anion.
10. A process for separating dihydrostreptomycin from mannosido dihydrostreptomycin associated therewith, which comprises forming a concentrated aqueous solution of the mixture combined with a single inorganic acid, adding at least 1 molar equivalent of a water-soluble salt of a different inorganic acid, and recovering the mixed acid salt of dihydrostreptomycin which crystallizes out.
11. A process for separating dihydrostreptomycin from mannosido dihydrostreptomycin associated therewith, which comprises forming an aqueous solution of the mixture and a single inorganic acid anion, adding at least one molar equivalent of at least one different inorganic acid anion, and recovering the mixed acid salt of dihydrostreptomycin which crystallizes out.

References Cited in the file of this patent

UNITED STATES PATENTS

| 2,485,106 | Mueller | Oct. 18, 1949 |
| 2,552,547 | Fried et al. | May 15, 1951 |
| 2,560,891 | Regna | July 17, 1951 |
| 2,590,140 | Wolf | Mar. 25, 1952 |

OTHER REFERENCES

Jones: Inorganic Chemistry (1947), pages 300–301.

I. A. Solomons et al.: Science, vol. 109 (1949) page 515.

F. J. Wolf et al.: Science, vol. 109 (1949) pages 515–516.